(12) United States Patent
Wu et al.

(10) Patent No.: US 11,014,668 B2
(45) Date of Patent: May 25, 2021

(54) AGRICULTURAL UNMANNED AERIAL VEHICLE

(71) Applicant: SZ DJI TECHNOLOGY CO., LTD., Shenzhen (CN)

(72) Inventors: Xiaolong Wu, Shenzhen (CN); Xumin Wu, Shenzhen (CN); Li Qiu, Shenzhen (CN); Le Zhou, Shenzhen (CN)

(73) Assignee: SZ DJI TECHNOLOGY CO., LTD., Shenzhen (CN)

( * ) Notice: Subject to any disclaimer, the term of this patent is extended or adjusted under 35 U.S.C. 154(b) by 290 days.

(21) Appl. No.: 16/120,590

(22) Filed: Sep. 4, 2018

(65) Prior Publication Data
US 2019/0009907 A1    Jan. 10, 2019

Related U.S. Application Data

(63) Continuation of application No. PCT/CN2016/107148, filed on Nov. 24, 2016.

(51) Int. Cl.
*B64C 39/02* (2006.01)
*A01G 25/00* (2006.01)
(Continued)

(52) U.S. Cl.
CPC ............ *B64C 39/024* (2013.01); *A01G 25/00* (2013.01); *A01G 25/16* (2013.01); *B64D 1/18* (2013.01);
(Continued)

(58) Field of Classification Search
CPC .. B64C 2201/12; B64C 2201/128; B64D 1/18
See application file for complete search history.

(56) References Cited

U.S. PATENT DOCUMENTS 4,480,791 A * 11/1984 Ward ................ B64D 1/18
239/533.15
10,011,352 B1 * 7/2018 Dahlstrom ............ B64C 39/024
(Continued)

FOREIGN PATENT DOCUMENTS

CN    102358425 A    2/2012
CN    104554725 A    4/2015
(Continued)

OTHER PUBLICATIONS

The World Intellectual Property Organization (WIPO) International Search Report for PCT/CN2016/107148 dated Mar. 30, 2017 5 pages.

*Primary Examiner* — Philip J Bonzell
*Assistant Examiner* — Tye William Abell
(74) *Attorney, Agent, or Firm* — Anova Law Group, PLLC

(57) ABSTRACT

An agricultural unmanned aerial vehicle (UAV) includes a fuselage, a flight power apparatus, a plurality of spray nozzles, a plurality of water pumps, and a controller. The flight power apparatus is mounted at the fuselage. The plurality of spray nozzles are installed below the flight power apparatus. The plurality of water pumps are connected to the plurality of spray nozzles and configured to deliver liquid to the spray nozzles. The controller is electrically coupled to the plurality of water pumps, and configured to selectively control one or more of the plurality of water pumps to pump the liquid to one or more of the spray nozzles connected to the one or more of the water pumps.

20 Claims, 5 Drawing Sheets

(51) Int. Cl.
  *B64D 1/18* (2006.01)
  *A01G 25/16* (2006.01)
(52) U.S. Cl.
  CPC .. *B64C 2201/024* (2013.01); *B64C 2201/027* (2013.01); *B64C 2201/108* (2013.01); *B64C 2201/12* (2013.01); *B64C 2201/128* (2013.01); *B64C 2201/141* (2013.01)

(56) References Cited

U.S. PATENT DOCUMENTS

| | | | | |
|---|---|---|---|---|
| 2005/0279880 | A1* | 12/2005 | Bundo | B64B 1/28 244/30 |
| 2013/0068892 | A1* | 3/2013 | Bin Desa | B64C 39/024 244/190 |
| 2016/0307448 | A1* | 10/2016 | Salnikov | A01B 79/005 |
| 2018/0319499 | A1* | 11/2018 | Holly | G05D 7/0617 |

FOREIGN PATENT DOCUMENTS

| | | |
|---|---|---|
| CN | 104670499 A | 6/2015 |
| CN | 104925256 A | 9/2015 |
| CN | 105292483 A | 2/2016 |
| CN | 205150255 U | 4/2016 |
| CN | 205366078 U | 7/2016 |
| CN | 205455559 U | 8/2016 |
| CN | 205499376 U | 8/2016 |
| CN | 205611596 U | 10/2016 |
| CN | 205707373 U | 11/2016 |
| JP | H0398666 A | 4/1991 |
| JP | H1156200 A | 3/1999 |
| JP | H1198945 A | 4/1999 |
| JP | 2000037156 A | 2/2000 |
| JP | 2009166689 A | 7/2009 |
| JP | 5890569 B1 | 3/2016 |

\* cited by examiner

AGRICULTURAL UNMANNED AERIAL VEHICLE

CROSS-REFERENCE TO RELATED APPLICATION

This application is a continuation application of International Application No. PCT/CN2016/107148, filed on Nov. 24, 2016, the entire contents of which are incorporated herein by reference.

TECHNICAL FIELD

The present disclosure relates to an unmanned aerial vehicle and, more particularly, to an agricultural unmanned aerial vehicle and a spray control method thereof.

BACKGROUND

Conventional multi-rotor agricultural unmanned aerial vehicles (UAVs) generally use a single water pump connected to a pipeline. One end of the pipeline is connected to a spray nozzle, such that a spray liquid path is formed. The method can only realize on-off of the liquid circuit system and cannot realize precisely controlled spraying.

SUMMARY

In accordance with the disclosure, there is provided an agricultural unmanned aerial vehicle (UAV) including a fuselage, a flight power apparatus, a plurality of spray nozzles, a plurality of water pumps, and a controller. The flight power apparatus is mounted at the fuselage. The plurality of spray nozzles are installed below the flight power apparatus. The plurality of water pumps are connected to the plurality of spray nozzles and configured to deliver liquid to the spray nozzles. The controller is electrically coupled to the plurality of water pumps, and configured to selectively control one or more of the plurality of water pumps to pump the liquid to one or more of the spray nozzles connected to the one or more of the water pumps.

DETAILED DESCRIPTION OF THE EMBODIMENTS

Figure 1:
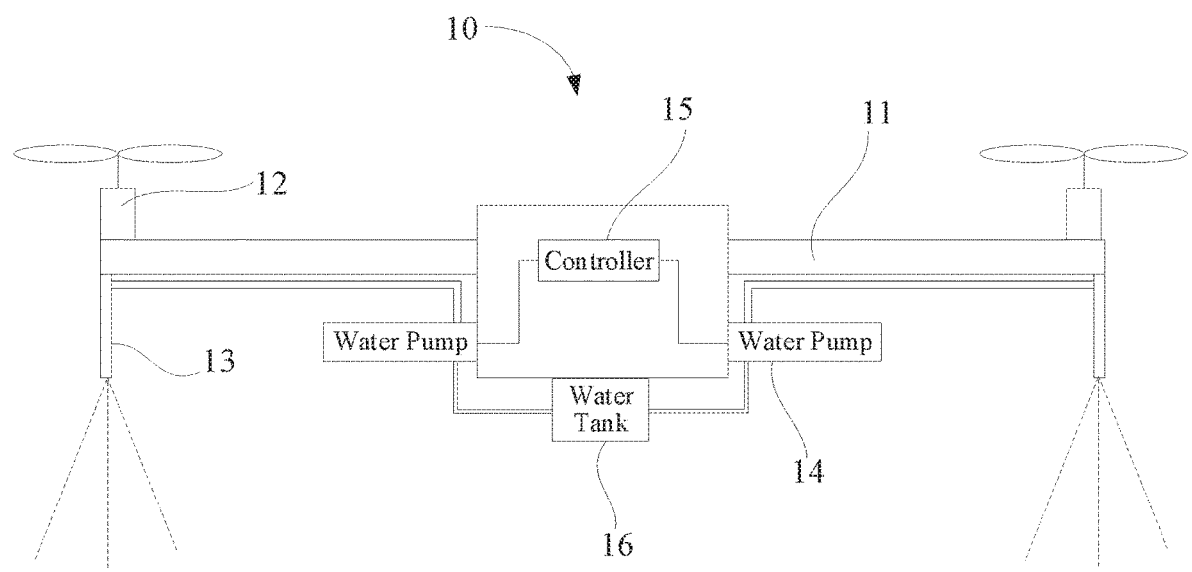
FIG. 1 is a side view of an exemplary agricultural unmanned aerial vehicle (UAV) according to various disclosed embodiments of the present disclosure.

Technical solutions of the present disclosure will be described with reference to the drawings. It will be appreciated that the described embodiments are some rather than all of the embodiments of the present disclosure. Other embodiments conceived by those having ordinary skills in the art on the basis of the described embodiments without inventive efforts should fall within the scope of the present disclosure.

Exemplary embodiments will be described with reference to the accompanying drawings, in which the same numbers refer to the same or similar elements unless otherwise specified.

As used herein, when a first component is referred to as "fixed to" a second component, it is intended that the first component may be directly attached to the second component or may be indirectly attached to the second component via another component. When a first component is referred to as "connecting" to a second component, it is intended that the first component may be directly connected to the second component or may be indirectly connected to the second component via a third component between them. The terms "perpendicular," "horizontal," "left," "right," and similar expressions used herein are merely intended for description.

Unless otherwise defined, all the technical and scientific terms used herein have the same or similar meanings as generally understood by one of ordinary skill in the art. As described herein, the terms used in the specification of the present disclosure are intended to describe exemplary embodiments, instead of limiting the present disclosure. The term "and/or" used herein includes any suitable combination of one or more related items listed.

The present disclosure provides an agricultural unmanned aerial vehicle (UAV) including a plurality of spray nozzles for spraying pesticides, water, and other liquids. According to different conditions, spray nozzles at different positions may be selected to achieve an appropriate spray performance, thereby improving a spray accuracy.

In some embodiments, spray nozzles at a proper position may be selected according to a flight direction of the agricultural UAV. For example, if a spray penetration capability needs to be increased, when the agricultural UAV is flying towards a nose direction of the agricultural UAV, also referred to as a "head direction" of the agricultural UAV, spray nozzles of the nose direction may be selected. Accordingly, sprayed droplets may accelerate downward under influence of airflows generated by a flight power apparatus of the UAV. If it is needed to prevent the droplets sprayed by the spray nozzles from being influenced by airflows, when the agricultural UAV flies towards a nose direction of the agricultural UAV, spray nozzles of a tail direction may be selected, such that sprayed droplets may not be influenced by airflows generated by the flight power apparatus of the UAV.

In some embodiments, spray nozzles at a proper position may be selected according to a wind direction of a working environment of the agricultural UAV. For example, if the agricultural UAV flies upwind, spray nozzles in the nose direction of the agricultural UAV may be selected to reduce deviations caused by drift of sprayed droplets. If the agricultural UAV flies downwind, spray nozzles in a tail direction may be selected to reduce deviations caused by drift of sprayed droplets.

In some embodiments, spray nozzles at a proper position may be selected according to an orientation of the agricultural UAV with respect to an operation area. For example, if the agricultural UAV sprays along a boundary of the operation area clockwise, spray nozzles on the right side of the agricultural UAV may be selected to prevent spraying relatively more outside the operation area. If the agricultural UAV sprays along a boundary of the operation area counterclockwise, spray nozzles on the left side of the agricultural UAV may be selected to prevent spraying relatively more outside the operation area.

In some embodiments, the agricultural UAV may automatically select spray nozzles at a corresponding position according to a preset condition. In some embodiments, the agricultural UAV can choose spray nozzles at corresponding position(s) according to a user's input information and allow the user to select according to a current condition.

Descriptions of some implementation approaches are described below with reference to figures. In the present disclosure, the disclosed embodiments and the features of the disclosed embodiments may be combined under conditions without conflicts.

Figure 2:
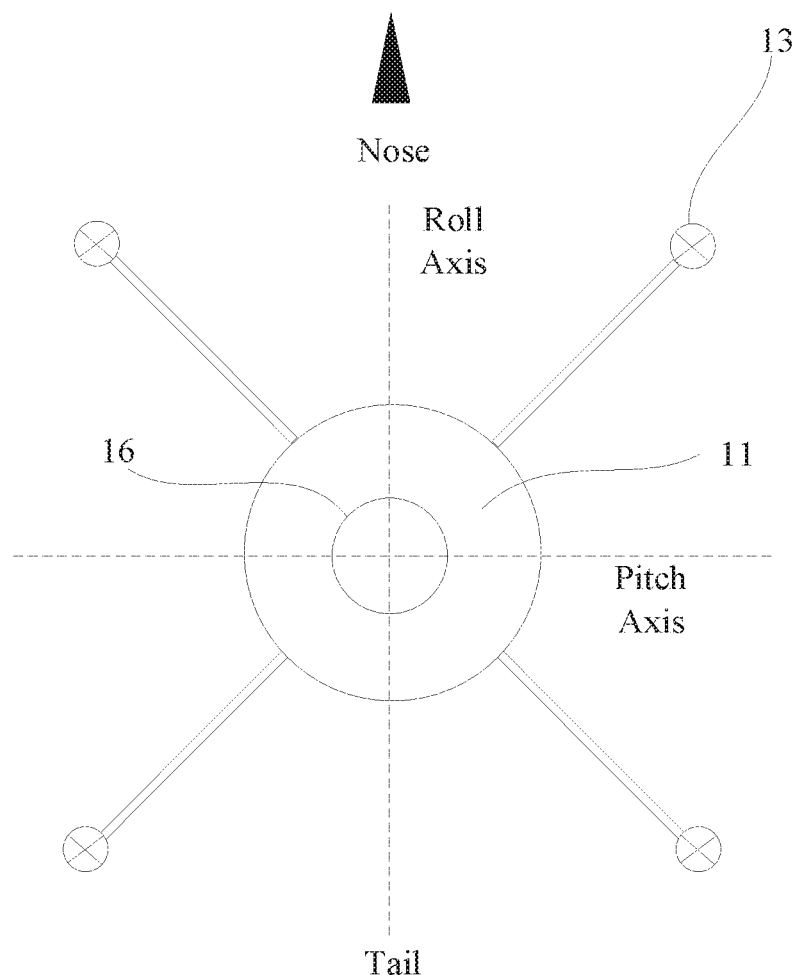
FIG. 2 is a bottom view of the exemplary agricultural UAV shown in FIG. 1 according to various disclosed embodiments of the present disclosure.

FIG. 1 is a side view of an exemplary agricultural unmanned aerial vehicle (UAV) according to various disclosed embodiments of the present disclosure. FIG. 2 is a bottom view of the exemplary agricultural UAV shown in FIG. 1 according to various disclosed embodiments of the present disclosure. Referring to FIGS. 1 and 2, in some embodiments, the agricultural UAV 10 includes a fuselage 11, flight power apparatuses 12, a plurality of spray nozzles 13, a plurality of water pumps 14, a controller 15, and a water tank 16.

The flight power apparatus 12 is mounted to the fuselage 11 for providing flight power. The plurality of spray nozzles 13 are mounted below the flight power apparatuses 12. The plurality of water pumps 14 are connected to the plurality of spray nozzles 13, for delivering liquid flows to the spray nozzles 13, and the liquid can be sprayed out through the spray nozzles 13. The controller 15 is electrically connected to the water pumps 14. The water tank 16 is configured to contain liquid. The plurality of water pumps 14 are connected to the water tank 16.

The controller 15 can selectively control the plurality of the water pumps 14 and spraying the liquid by nozzles 13 connected to the selected water pumps 14.

By selectively controlling the plurality of the water pumps 14, the controller 15 can select corresponding spray nozzles 13 for spraying. As such, a spray area and/or a spray performance can be controlled, and a spray accuracy can be improved.

The plurality of spray nozzles 13 may be arranged at different positions of the UAV fuselage 11. For example, as shown in FIG. 1, the plurality of spray nozzles 13 may be arranged directly below the plurality of flight power apparatuses 12. Some of the plurality of spray nozzles 13 may be arranged near the nose of the agricultural UAV 10. Others of the plurality of spray nozzles 13 may be arranged near the tail of the agricultural UAV 10.

A plurality of spray nozzles 13 arranged near the nose of the agricultural UAV 10 may be connected to one water pump 14. A plurality of spray nozzles 13 arranged near the tail of the agricultural UAV may be connected to another water pump 14. Accordingly, it is relatively convenient to select the plurality of spray nozzles 13 arranged near the nose of the agricultural UAV 10, or the plurality of spray nozzles 13 arranged near the tail of the agricultural UAV 10.

Figure 3:
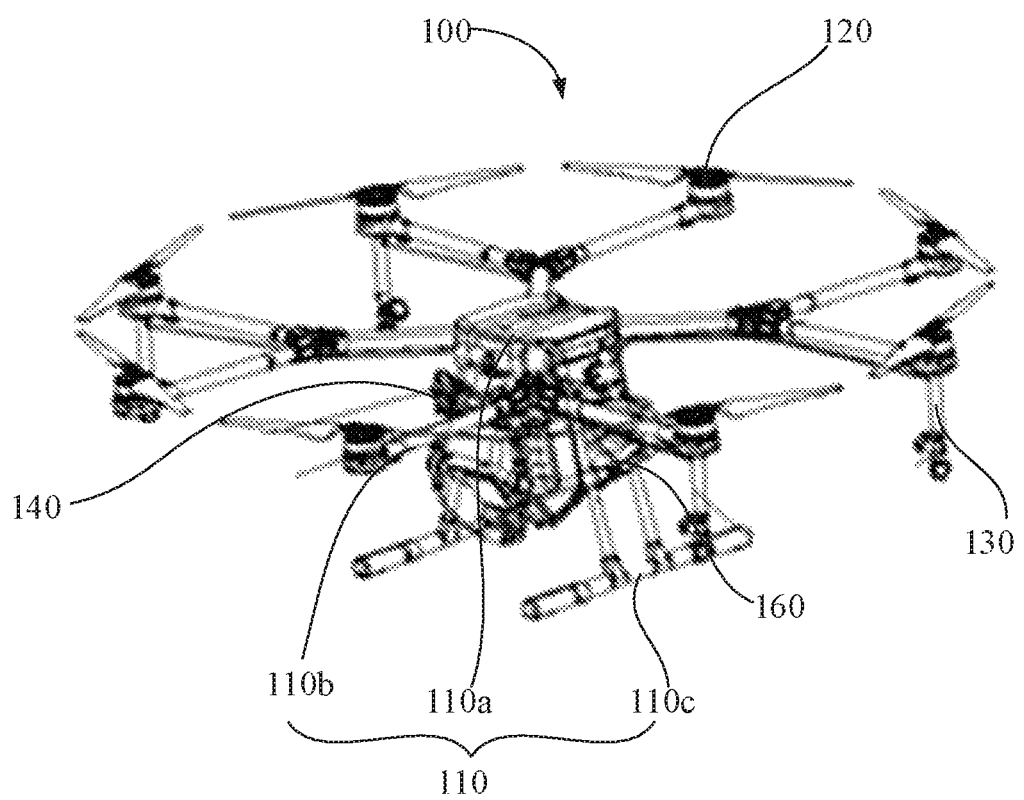
FIG. 3 is a perspective view of another exemplary agricultural UAV according to various disclosed embodiments of the present disclosure.
Figure 4:
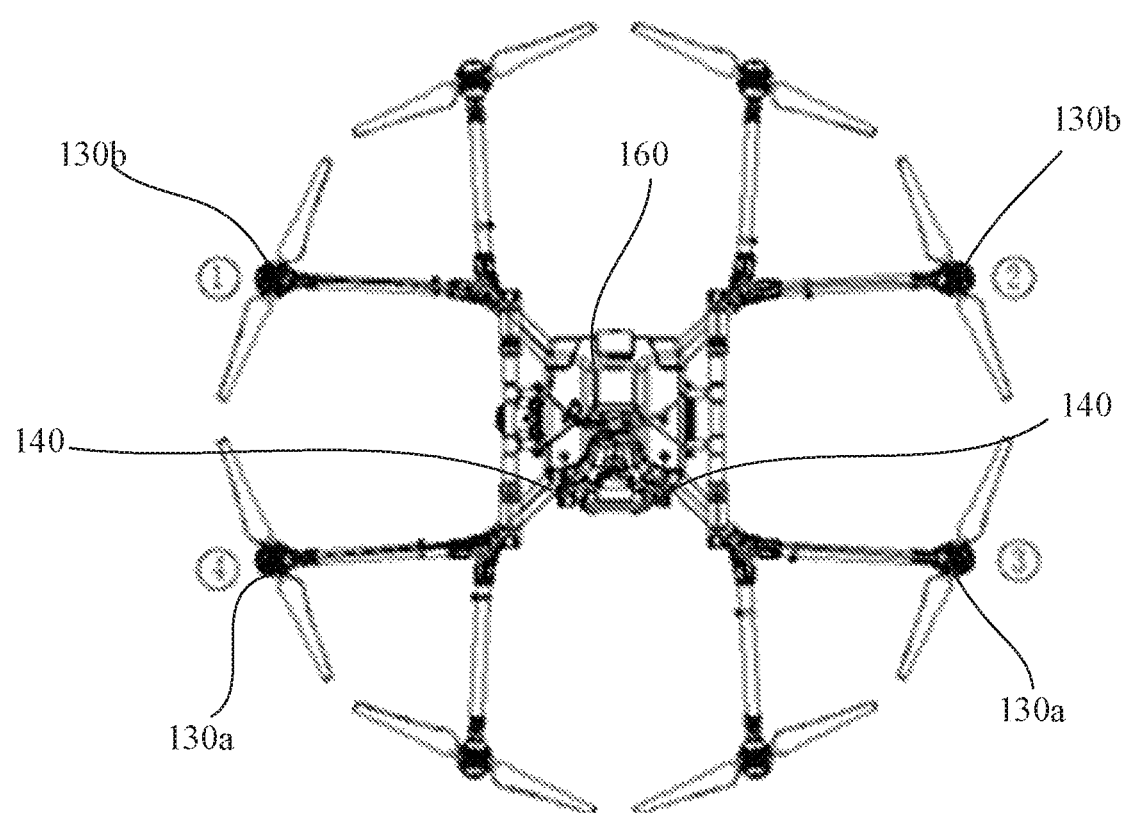
FIG. 4 is a bottom view of the exemplary agricultural UAV shown in FIG. 3 according to various disclosed embodiments of the present disclosure.
Figure 5:
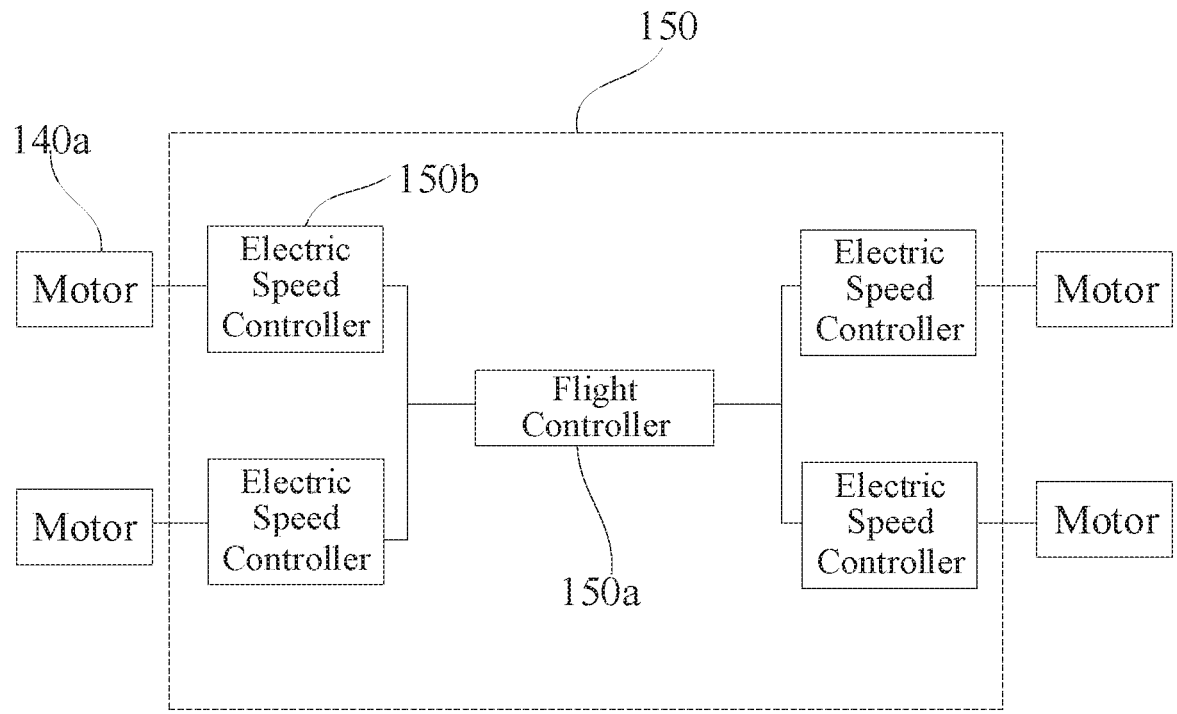
FIG. 5 is a block diagram of an exemplary controller for the exemplary agricultural UAV shown in FIG. 3 according to various disclosed embodiments of the present disclosure.
Figure 6:
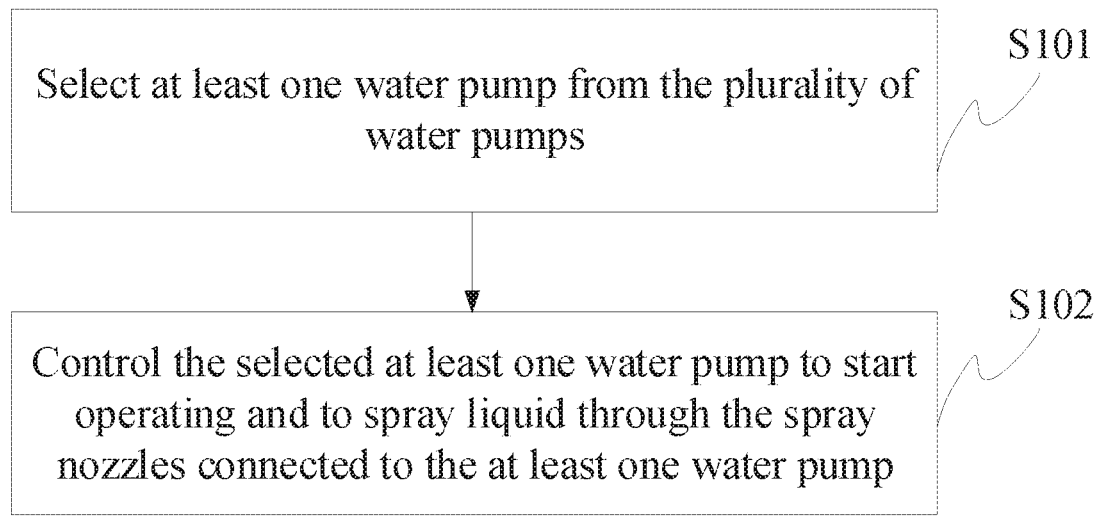
FIG. 6 is a flow chart of an exemplary spray control method of an exemplary agricultural UAV according to various disclosed embodiments of the present disclosure.

FIG. 3 is a perspective view of another exemplary agricultural UAV according to various disclosed embodiments of the present disclosure. FIG. 4 is a bottom view of the exemplary agricultural UAV shown in FIG. 3 according to various disclosed embodiments of the present disclosure. FIG. 5 is a block diagram of an exemplary controller for the exemplary agricultural UAV shown in FIG. 3 according to various disclosed embodiments of the present disclosure.

Referring to FIGS. 3 to 5, in some embodiments, an agricultural UAV 100 includes a fuselage 110, flight power apparatuses 120, a plurality of spray nozzles 130, a plurality of water pumps 140, and a controller 150.

The flight power apparatuses 120 are mounted to the fuselage 110 for providing flight power. The plurality of spray nozzles 130 are arranged below the flight power apparatuses 120. The plurality of water pumps 140 are connected to the plurality of spray nozzles 130, for delivering liquid flows to the spray nozzles 130 and for spraying out through the spray nozzles 130. The controller 150 is electrically connected to the water pumps 140. The water tank 160 is configured to store liquid. The plurality of water pumps 140 are connected to the water tank 160.

The controller 150 can selectively control the plurality of the water pumps 140 and spray liquid through the nozzles 130 connected to selected water pumps 140.

By selectively controlling the plurality of the water pumps 140, corresponding spray nozzles 130 may be selected for spraying, a spray area and/or a spray performance can be controlled, and a spray precision can be improved.

The structure of the fuselage 110 can be chosen according to application scenarios. For example, in some embodiments, such as those shown in the figures, the fuselage 110 includes a central body 110a, arms 110b, and landing gears 110c. The arms 110b are connected to the central body 110a and support the flight power apparatuses 120. The landing gears 110c are connected to the central body 110a or the arm 110b.

The flight power apparatus 120 may include an electric power apparatus. In some embodiments, such as those shown in the figures, the flight power apparatus 12 may include a propeller and a motor that drive the propeller to rotate.

The spray nozzle 130 may be arranged directly below or obliquely below the flight power apparatus 120. In some embodiments, such as those shown in the figures, the plurality of the spray nozzles may be mounted at the arms 110b and/or the landing gears 110c. In the embodiments that the plurality of spray nozzles 130 are mounted at the arms 110b, the spray nozzles 130 may be directly under the flight power apparatuses 120. Accordingly, the spray penetration capability of the spray nozzles 130 may be improved.

Positions of the plurality of spray nozzles 130 may also be chosen according to various application scenarios. For example, the plurality of spray nozzles 130 may be symmetrically arranged with respect to a roll axis of the agricultural UAV 100. As anther example, the plurality of spray nozzles 130 may be symmetrically arranged with respect to a pitch axis of the agricultural UAV 100.

When the plurality of spray nozzles 130 are symmetrically arranged with respect to the roll axis of the agricultural UAV 100, it is convenient to control the spray nozzles 130 on the left and right sides of the agricultural UAV 100 to spray. For example, if the agricultural UAV 100 sprays along a boundary of an operation area clockwise, the spray nozzles 130 on the right side of the agricultural UAV 100 may be controlled to spray. If the agricultural UAV 100 sprays along a boundary of an operation area in counterclockwise, spray nozzles 130 on the left side of the agricultural UAV 100 may be controlled to spray.

In some embodiments, such as those shown in the figures, the plurality of spray nozzles 130 include nose direction spray nozzles 130a and tail direction spray nozzles 130b. The nose direction spray nozzles 130a may be arranged near the nose of the agricultural UAV 100. The tail direction spray nozzles 130*bb* may be arranged near the tail of the agricultural UAV 100.

If the spray penetration capability needs to be increased, when the agricultural UAV 100 flies in the nose direction, the nose direction spray nozzles 130*a* may be selected, such that the sprayed droplets may accelerate downward under influence of airflows generated by the flight power apparatus 120 of the UAV. If it is needed to prevent the droplets sprayed by the spray nozzles 130 from being influenced by airflows, when the agricultural UAV flies towards a nose direction of the agricultural UAV 100, tail direction spray nozzles 130*b* may be selected, such that sprayed droplets may not be influenced by airflows generated by the flight power apparatuses 120 of the UAV.

Each of the water pumps 140 may be connected to a plurality of spray nozzles 130. For example, on each side of the roll axis of the agricultural UAV 100 there may be arranged a plurality of spray nozzles 130 that are connected to one water pump 140. As another example, on each side of the pitch axis of the agricultural UAV 100 there may be arranged a plurality of spray nozzles 130 that are connected to one water pump 140.

Because the spray nozzles 130 located in a same region are connected to one water pump 140, the spray nozzles 130 in the same region may be relatively easy to control for spraying. For example, one water pump 140 may control a plurality of spray nozzles 130 at a corresponding side of the roll axis of the agricultural UAV to spray. As another example, one water pump 140 may control a plurality of spray nozzles 130 at a corresponding side of the pitch axis of the agricultural UAV 100 to spray.

In some embodiments, such as those shown in the figures, a plurality of nose direction spray nozzles 130*a* may be provided. The plurality of nose direction spray nozzles 130*a* may be arranged at two sides of the fuselage 110. The plurality of nose direction spray nozzles 130*a* may be connected to one water pump 140. In some embodiments, a plurality of tail direction spray nozzles 130*b* may be provided. The plurality of tail direction spray nozzles 130*b* may be arranged at two sides of the fuselage 110. The plurality of nose direction spray nozzles 130*b* may be connected to one water pump 140.

The controller 150 can select and control a plurality of water pumps 140 according to a user input signal. In some embodiments, the controller 150 may automatically select and control a plurality of water pumps 140 according to a preset condition. The preset condition may include at least one of a flight direction of the agricultural UAV 100, a wind direction of a working environment, an orientation of the agricultural UAV 100 with respect to an operation area.

For example, the controller 150 may automatically select and control a plurality of water pumps 140 according to a flight direction. In some embodiments, when the agricultural UAV 100 flies towards the nose direction, the controller 150 may select and control a water pump 140 connected to the nose direction spray nozzles 130*a* or another water pump 140 connected to the tail direction spray nozzles 130*b*, to perform spraying through the nose direction spray nozzles 130*a* or the tail direction spray nozzles 130*b*.

In some embodiments, the controller 150 may automatically select and control a water pump 140 connected to spray nozzles 130 at one side of the roll axis of the agricultural UAV 100, or another water pump 140 connected to spray nozzles 130 at the other side of the roll axis of the agricultural UAV 100, according to an orientation of the agricultural UAV 100 with respect to an operation area.

In some embodiments, the controller 150 may select and control a water pump 140 connected to spray nozzles 130 at one side of the pitch axis of the agricultural UAV 100, or anther water pump 140 connected to spray nozzles 130 at the other side of the pitch axis of the agricultural UAV 100, according to a flight direction of the agricultural UAV 100, a wind direction of a working environment, or a combination of the flight direction of the agricultural UAV and the wind direction of the working environment.

In some embodiments, such as those shown in the figures, when the agricultural UAV 100 flies towards the tail direction, the controller 150 may select and control a water pump 140 connected to nose direction spray nozzles 130*a* or a water pump 140 connected to tail direction spray nozzles 130*b*, such that droplets may be sprayed by the nose direction spray nozzles 130*a* or the tail direction spray nozzles 130*b*. For example, if the spray penetration capability needs to be increased, then when the agricultural UAV 100 flies in the nose direction, the nose direction spray nozzles 130*a* may be selected, such that the sprayed droplets may accelerate downward under influence of airflows generated by the flight power apparatus 120 of the UAV. If it is needed to prevent the droplets sprayed by the spray nozzles 130 from being influenced by airflows, then when the agricultural UAV flies towards a nose direction of the agricultural UAV 100, tail direction spray nozzles 130*b* may be selected, such that sprayed droplets may not be influenced by airflows generated by the flight power apparatuses 120 of the UAV.

The structure of the controller 150 may also be chosen according to various application scenarios. For example, as shown FIG. 5, the controller 150 includes a flight controller 150*a* and a plurality of electric speed controllers 150*b*. The flight controller 150*a* may be configured to control a flight attitude of the agricultural UAV 100. The plurality of electric speed controllers 150*b* may communicate with the flight controller 150*a*.

The water pump 140 may include, for example, a diaphragm pump, a rotary pump, a vane pump, a centrifugal pump, an axial flow pump, a mixed flow pump, a vortex pump, a jet pump, or the like. As shown in FIG. 5, the water pump 140 includes a driving motor 140*a*. Each of the electric speed controllers 150*b* is electrically connected to the motor 140*a* of one water pump 140 for controlling an operation status of the motor 140*a*.

The motor may include a brushed direct-current (DC) motor or a brushless DC motor. The motor may include an external rotor motor or an internal rotor motor. In some embodiments, such as those shown in the figures, the motor may include a brushless DC motor, and the electric speed controller may drive the motor through a pulse width modulation (PWM) wave modulation method. By using the brushless electric speed controller to change the PWM value, a rotation speed of the water pump 140 may be changed, and thus changes of output pressure of the water pump 140 may be controlled, and flow control of the spray nozzle 130 may be achieved, thereby further improving an accuracy of spraying.

The water tank 160 may be connected to the water pumps 140 through pipes. The water pump 140 may be connected to the spray nozzle(s) 130 through pipe(s). After the water pump 140 draws liquid from the water tank 160, the liquid may be sent to the spray nozzles 130 through the pipes and sprayed out by the spray nozzles 130.

The water tank 160 may store pesticides, water, and/or other liquids. The water tank 160 may be installed below the central body 110*a* of the fuselage 110. In some embodiments, the water tank 160 may be securely attached to the central body 110a of the fuselage 110. In some other embodiments, the water tank 160 may be securely attached to the landing gear(s) 110c of the fuselage 110.

Referring to FIGS. 3 to 6, based on the above-described agricultural UAV 100, the present disclosure further provides a spray control method for an agricultural UAV, such as the above-described agricultural UAV 100.

The spray control method for an agricultural UAV may include processes described below.

At S 101, at least one water pump 140 is selected from the plurality of water pumps 140. Each of the plurality of water pumps 140 is connected to one or more of the plurality of spray nozzles 130.

The positions of the plurality of spray nozzles 130 may be chosen according to various application scenarios. For example, the plurality of spray nozzles 130 may be symmetrically arranged with respect to a roll axis of the agricultural UAV 100. A water pump 140 connected to the spray nozzles 130 at one side of the roll axis of the agricultural UAV 100 or another water pump 140 connected to the spray nozzles 130 at the other side of the roll axis of the agricultural UAV 100 may be selected.

As anther example, the plurality of spray nozzles 130 may be symmetrically arranged with respect to a pitch axis of the agricultural UAV 100. A water pump 140 connected to the spray nozzles 130 at one side of the pitch axis of the agricultural UAV 100 or another water pump 140 connected to the spray nozzles 130 at the other side of the pitch axis of the agricultural UAV 100 may be selected.

In some embodiments, such as those shown in the figures, the plurality of spray nozzles 130 include the nose direction spray nozzles 130a and the tail direction spray nozzles 130b. The nose direction spray nozzles 130a may be arranged near the nose of the agricultural UAV 100. The tail direction spray nozzles 130b may be arranged near the tail of the agricultural UAV 100.

Each of the water pumps 140 may be connected to a plurality of spray nozzles 130. For example, on each side of the roll axis of the agricultural UAV 100, a plurality of spray nozzles 130 may be provided, and may be connected to one water pump 140. As another example, on each side of the pitch axis of the agricultural UAV 100, a plurality of spray nozzles 130 may be provided, and may be connected to one water pump 140.

In some embodiments, such as those shown in the figures, a plurality of nose direction spray nozzles 130a may exist. The plurality of nose direction spray nozzles 130a may be arranged at two sides of the fuselage 110. The plurality of nose direction spray nozzles 130a may be connected to one water pump 140. A plurality of tail direction spray nozzles 130b may exist. The plurality of tail direction spray nozzles 130b may be arranged at two sides of the fuselage 110. The plurality of tail direction spray nozzles 130b may be connected to one water pump 140.

For example, when the agricultural UAV 100 flies towards the nose direction, a water pump 140 connected to the nose direction spray nozzles 130a or another water pump 140 connected to the tail direction spray nozzles 130b may be selected to perform spraying through the nose direction spray nozzles 130a or the tail direction spray nozzles 130b.

As another example, when the agricultural UAV 100 flies towards the tail direction, a water pump 140 connected to the nose direction spray nozzles 130a or another water pump 140 connected to the tail direction spray nozzles 130b may be selected to perform spraying through the nose direction spray nozzles 130a or the tail direction spray nozzles 130b.

At S 102, the selected at least one water pump 140 is controlled to start operating and to spray liquid through the spray nozzles 130 connected to the at least one water pump 140.

The water pump 140 may include, for example, a diaphragm pump, a rotary pump, a vane pump, a centrifugal pump, an axial flow pump, a mixed flow pump, a vortex pump, a jet pump, or the like. The water pump 140 may include a driving motor. Each of the electric speed controllers may be electrically connected to one motor of one water pump 140 for controlling an operation status of the motor.

The motor may include a brushed direct-current (DC) motor or a brushless DC motor. The motor may include an external rotor motor or an internal rotor motor. In some embodiments, such as embodiments described in connection with some of the figures, the motor may include a brushless DC motor, and the motor may be driven through pulse width modulation (PWM) wave modulation method.

The present disclosure provides an agricultural unmanned aerial vehicle (UAV) and a spray control method thereof. The agricultural UAV may include a fuselage, one or more flight power apparatuses mounted to the fuselage and providing flight power, a plurality of spray nozzles below the one or more flight power apparatuses, a plurality of water pumps connected to the plurality of spray nozzles, for transmitting liquid flows to the plurality of spray nozzles and spraying the liquid out through the spray nozzles, a controller electrically connected to the water pumps, and a water tank for storing liquid. The plurality of the water pumps may be connected to the water tank. The controller can selectively control a plurality of the water pumps, and may spray through spray nozzles connected to selected water pumps. Thus, a spray area and/or a spray performance may be controlled, and a spray accuracy may be improved.

Those of ordinary skill in the art will appreciate that the exemplary elements and algorithm steps described above can be implemented in electronic hardware, or in a combination of computer software and electronic hardware. Whether these functions are implemented in hardware or software depends on the specific application and design constraints of the technical solution. One of ordinary skill in the art can use different methods to implement the described functions for different application scenarios, but such implementations should not be considered as beyond the scope of the present disclosure.

For simplification purposes, detailed descriptions of the operations of exemplary systems, devices, and units may be omitted and references can be made to the descriptions of the exemplary methods.

The disclosed systems, apparatuses, and methods may be implemented in other manners not described here. For example, the devices described above are merely illustrative. For example, the division of units may only be a logical function division, and there may be other ways of dividing the units. For example, multiple units or components may be combined or may be integrated into another system, or some features may be ignored, or not executed. Further, the coupling or direct coupling or communication connection shown or discussed may include a direct connection or an indirect connection or communication connection through one or more interfaces, devices, or units, which may be electrical, mechanical, or in other form.

The units described as separate components may or may not be physically separate, and a component shown as a unit may or may not be a physical unit. That is, the units may be located in one place or may be distributed over a plurality of network elements. Some or all of the components may be selected according to the actual needs to achieve the object of the present disclosure.

In addition, the functional units in the various embodiments of the present disclosure may be integrated in one processing unit, or each unit may be an individual physically unit, or two or more units may be integrated in one unit. The above-described integrated units can be implemented in electronic hardware, or in a combination of computer software and electronic hardware.

A method consistent with the disclosure can be implemented in the form of computer program stored in a non-transitory computer-readable storage medium, which can be sold or used as a standalone product. The computer program can include instructions that enable a computer device, such as a processor, a personal computer, a server, or a network device, to perform part or all of a method consistent with the disclosure, such as one of the exemplary methods described above. The storage medium can be any medium that can store program codes, for example, a USB disk, a mobile hard disk, a read-only memory (ROM), a random access memory (RAM), a magnetic disk, or an optical disk.

Other embodiments of the disclosure will be apparent to those skilled in the art from consideration of the specification and practice of the embodiments disclosed herein. It is intended that the specification and examples be considered as exemplary only and not to limit the scope of the disclosure, with a true scope and spirit of the invention being indicated by the following claims.

What is claimed is:

1. An agricultural unmanned aerial vehicle (UAV), comprising:
    a fuselage;
    a flight power apparatus mounted at the fuselage;
    a plurality of spray nozzles installed below the flight power apparatus;
    a plurality of water pumps connected to the plurality of spray nozzles and configured to deliver liquid to the spray nozzles; and
    a controller electrically coupled to the plurality of water pumps, and configured to selectively control one or more of the plurality of water pumps to pump the liquid to one or more of the spray nozzles connected to the one or more of the water pumps, based on a flight direction,
    wherein in response to the agricultural UAV flying toward a nose direction, the controller selects a tail direction spray nozzle; and
    wherein in response to the agricultural UAV flying toward a tail direction, the controller selects a nose direction spray nozzle.

2. The agricultural UAV according to claim 1, wherein each of the plurality of water pumps is connected to more than one of the plurality of spray nozzles.

3. The agricultural UAV according to claim 1, wherein the spray nozzles are directly below or obliquely below the flight power apparatus.

4. The agricultural UAV according to claim 1, wherein:
    the fuselage includes a center body, one or more arms connected to the central body and support the flight power apparatus, and one or more landing gears connected to the center body or the one or more arms; and
    the plurality of spray nozzles are mounted at the one or more arms and/or the one or more landing gears.

5. The agricultural UAV according to claim 1, wherein:
    the controller includes a flight controller configured to control a flight attitude of the agricultural UAV and a plurality of electric speed controllers that communicate with the flight controller,
    each of the water pumps includes a driving motor, and
    each of the electric speed controllers is electrically coupled to the driving motor of one of the water pumps for controlling an operation status of the driving motor.

6. The agricultural UAV according to claim 5, wherein:
    the driving motor includes a brushless direct current motor, and
    the electric speed controller is configured to drive the driving motor through pulse width modulation wave modulation.

7. The agricultural UAV according to claim 1, wherein the plurality of spray nozzles are arranged symmetrically with respect to a roll axis of the agricultural UAV.

8. The agricultural UAV according to claim 7, wherein the controller is further configured to select and control a first one of the water pumps that is connected to one or more of the spray nozzles at one side of the roll axis of the agricultural UAV, or select and control a second one of the water pumps that is connected to one or more of the spray nozzles arranged at another side of the roll axis of the agricultural UAV.

9. The agricultural UAV according to claim 7, wherein:
    the one or more of the spray nozzles at each side of the roll axis of the agricultural UAV include a plurality of spray nozzles that are connected to a same one of the water pumps.

10. The agricultural UAV according to claim 1, wherein the plurality of spray nozzles are arranged symmetrically with respect to a pitch axis of the agricultural UAV.

11. The agricultural UAV according to claim 10, wherein the controller is further configured to select and control a first one of the water pumps that is connected to one or more of the spray nozzles at one side of the pitch axis of the agricultural UAV, or select and control a second one of the water pumps that is connected to one or more of the spray nozzles at another side of the pitch axis of the agricultural UAV.

12. The agricultural UAV according to claim 10, wherein:
    the one or more of the spray nozzles at each side of the pitch axis of the agricultural UAV include a plurality of spray nozzles that are connected to a same one of the water pumps.

13. The agricultural UAV according to claim 1, wherein the plurality of spray nozzles include:
    one or more nose direction spray nozzles arranged closer to a nose of the agricultural UAV than a tail of the agricultural UAV; and
    one or more tail direction spray nozzles arranged closer to the tail of the agricultural UAV than the nose of the agricultural UAV.

14. The agricultural UAV according to claim 13, wherein the one or more nose direction spray nozzles include a plurality of nose direction spray nozzles.

15. The agricultural UAV according to claim 14, wherein:
    the plurality of nose direction spray nozzles are arranged at two sides of the fuselage; and/or
    the plurality of nose direction spray nozzles are connected to one of the plurality of water pumps.

16. The agricultural UAV according to claim 13, wherein the one or more tail direction spray nozzles include a plurality of tail direction spray nozzles.

17. The agricultural UAV according to claim 16, wherein:
the plurality of tail direction spray nozzles are arranged at two sides of the fuselage; and/or
the plurality of tail direction spray nozzles are connected to one of the plurality of water pumps.

18. The agricultural UAV according to claim 13, wherein:
the controller is further configured to control the plurality of water pumps according to a preset condition, and
the preset condition includes at least one of a wind direction of a working environment, or an orientation of the agricultural UAV relative to an operation area.

19. The agricultural UAV according to claim 18, wherein:
the controller is further configured to, when the agricultural UAV flies towards a nose direction, select and control a first one of the water pumps that is connected to the one or more nose direction spray nozzles or a second one of the water pumps that is connected to the one or more tail direction spray nozzles to spray the liquid through the one or more nose direction spray nozzles or the one or more tail direction spray nozzles.

20. The agricultural UAV according to claim 18, wherein:
the controller is further configured to, when the agricultural UAV flies towards a tail direction, select and control a first one of the water pumps that is connected to the one or more nose direction spray nozzles or a second one of the water pumps that is connected to the one or more tail direction spray nozzles to spray the liquid through the one or more nose direction spray nozzles or the one or more tail direction spray nozzles.

* * * * *